3,074,900
Patented Jan. 22, 1963

3,074,900
COMPOSITION COMPRISING A CONJUGATED DIENE ELASTOMER AND PHENOL ETHER COMPOUNDS AND VULCANIZATE PRODUCED BY HEATING SAME
David Wasserman, Springfield, N.J., assignor to Minnesota Mining and Manufacturing Company, St. Paul, Minn., a corporation of Delaware
No Drawing. Filed May 5, 1960, Ser. No. 26,958
9 Claims. (Cl. 260—31.4)

This invention relates to novel compounds and to novel compositions of matter. In one of its more specific aspects the invention is directed to novel compositions of matter comprising a normally solid elastomer (A) selected from the group consisting of copolymers of butadiene 1,3 and styrene, copolymers of butadiene 1,3 and acrylonitrile and homopolymers of chloroprene being intimately combined with material (B) one or a combination of two or more of certain ethers of certain phenols to plasticize (A). In another of its more specific aspects the invention is directed to novel heat curable stocks comprising (1) such elastomers (A) which are vulcanizable, that is capable of being vulcanized or heat cured in the presence of a vulcanizing agent therefore, intimately combined with (2) vulcanizing material for (1), that is material capable of vulcanizing (1), and (3) material (B). In another of its aspects the invention is directed to novel vulcanizates produced by heat curing said stocks. And, in another of its aspects the invention is directed to a certain class of said ethers effective for the aforesaid purposes.

The ethers which are employed in the practice of this invention may be derived from compounds of the following Formula I:

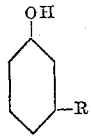

in which R is a straight chain unsaturated hydrocarbon radical of 15 carbon atoms, with said unsaturation being due solely to ethylenic linkage therein. By the expression "with said unsaturation due to ethylenic linkage therein," as employed in the description and claims, I mean that the unsaturation in R is due to one or more ethylenic linkages therein. Commercial sources of said compounds of Formula I are those products available on the market as decarboxylated cashew nut shell liquid and cardanol which consist chiefly of compounds of Formula I, with the number of ethylenic linkages in R numbering 1-3. The compounds employed in the practice of certain of the aspects of this invention may be derived from said compounds of Formula I and are compounds of the following general Formula II:

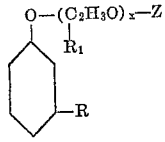

in which R is as before defined; $R_1$ is hydrogen or an alkyl radical of 1-9 carbon atoms; Z is hydrogen or $-OCR_2$, with $R_2$ being an alkyl radical of 1-10 carbon atoms or an alkenyl radical of 2-10 carbon atoms; and $x$ is 1-8. When Z is said $-OCR_2$, said compounds of Formula II are novel compounds of this invention and are hereinafter referred to as compounds of Formula IIB, but when said Z is hydrogen, said compounds are hereinafter referred to as compounds of Formula IIA.

In the course of my experimentations, I produced compounds of Formula IIB by first reacting a compound of Formula I with an alkylene oxide to produce compound of Formula IIA which is then esterified. Said compounds of Formula IIA and said novel compounds of Formula IIB are non-vesicant and non-irritating to the human skin and have a low pour point characteristic.

I discovered that said compounds of Formula II were compatible with said elastomers (A) and was surprised to discover that they acted as milling aids therefor and also as plasticizers therefor, and when added thereto on a rubber mill caused material reduction in milling time without adversely affecting the characteristics of the desired end products, and in addition decreased the brittle point, imparted low temperature flexibility and good heat ageing characteristics to the elastomer (A) intimately combined therewith, which have the additional advantageous characteristic of having a low volume loss at elevated temperatures. I further discovered that the amount of materials of Formula II which may be combined with said elastomers (A) may vary over wide limits and in general 10-100 parts of the former may be combined with 100 parts of the latter to provide a number of different products useful in various fields, such as adhesives, coatings and sealants. I still further discovered that the presence of compounds of Formula II in heat curable stocks of such elastomers (A) which are vulcanizable not only acted as plasticizers thereof but in addition surprisingly and unexpectedly increased the ability thereof to accept fillers, such as silica, carbon black, calcium carbonate, etc. normally employed therewith and also surprisingly and unexpectedly imparted to the vulcanizates produced from such stocks including such elastomers (A), (B) and (C) material for vulcanizing (A) the characteristics of high tensile strength, high elongation, good heat ageing with retention of high elongation, and also good low temperature flexibility characteristics, whereby said vulcanizates are useful as hose, cable coating material and in tires.

In general, compounds of Formula IIA may be prepared by charging into a reaction vessel a quantity of one or a combination of two or more compounds of Formula I and a quantity of a 50% aqueous solution of sodium hydroxide measuring about 1% of the weight of said compound or compounds of Formula I therein. The materials in said vessel are mixed together and vacuum is applied to the vessel. While under vacuum the mass in the vessel is heated to a temperature of about 110° C. for complete dehydration. The vacuum is released with an inert gas, a condenser is connected to the vessel for refluxing and the desired alkylene oxide in the desired proportion is slowly added thereto while maintaining the mass at elevated temperature. After the desired amount of alkylene oxide has been reacted, the mass is cooled, and neutralized, and then its temperature increased under vacuum to dehydrate. The resultant compound or compounds of Formula IIA are separated from the remainder in any convenient manner, and then are reacted with an equi-molecular proportion of an appropriate acid $R_2$—COOH. In some instances I prefer to use with said acid an equal weight of xylene. Such three component mix while being constantly stirred is brought to a boil whereupon the xylene and water of reaction are continuously distilled and condensed by a condenser and trap. When one mole of water has been collected in the trap, this signifies completion of reaction. Then the mass is vacuum distilled to separate xylene and unreacted acid, if any is present. In this general manner compounds of Formula IIB may be produced. Of course, it is understood that instead of using the acid, the anhydride thereof if available may be substituted therefor. When the acid anhydride is used of course no water of reaction is produced and after completion of reaction, the excess anhydride may be stripped off.

The following Examples IIA-1 to IIA-6 are given merely to illustrate methods for making as well as some of the compounds of Formula IIA which may be employed in the practice of one of the aspects of this invention and also may be employed as reactants for the production of novel compounds of Formula IIB, illustrative examples of which are Examples IIB-1 to IIB-4, all parts being given by weight unless otherwise specified.

*Example IIA-1*

Into a 5 liter flask equipped with stirrer, thermometer and vacum distillation set-up, were added 1500 grams of vacuum distilled cardanol, produced according to the method described in U.S. patent to S. Caplan, 2,559,594 issued on July 10, 1951, and then 15 grams of a 50% aqueous solution of sodium hydroxide with stirring. After said components had been uniformly distributed with respect to each other, the pressure in said flask was reduced to 20 mm. of mercury pressure and while under such sub-atmospheric pressure conditions, the mass in said flask was heated to a temperature of about 110° C., whereby the mass in said flask was completely dehydrated. Then the vacuum was released with nitrogen and the condenser in the vacuum distillation setup was now set for refluxing and 264 grams of ethylene oxide was slowly passed into the flask below the surface of the mass therein while the temperature thereof was maintained at approximately 160° C. After a period of approximately 2¾ hours, it was determined that 5.7 moles of ethylene oxide had reacted with said cardanol. The reaction mass was cooled to 90° C. and neutralized with 35.8 grams of 16% hydrochloric acid. Then the resultant mass was placed under vacuum so that the pressure in said flask measured approximately 20 mm. of mercury pressure. While under such sub-atmospheric pressure conditions, the mass was heated to about 110° C., whereby the mass was completely dehydrated. The vacuum was released and to said dehydrated mass 15 grams of "Celite" was added and this mixture was filtered through a ¼" bed of "Celite" on filter paper in a Buchner funnel at 110° C. The filtrate was a liquid, hereinafter known as Product IIA-1, measured 1700 grams and had a pour point of minus 31° C. and consisted essentially of reaction product Formula IIA, with $x$ being 1, and $R_1$ being H. A sample of said Product IIA-1 was subjected to the Gibbs test for free phenol and the results indicated less than one-half of 1% of free cardanol.

*Example IIA-2*

Employed the same procedure and components as set forth in Example IIA-1 except that in place of the 264 grams of ethylene oxide, 354 grams of propylene oxide were employed. The resultant product was liquid, hereafter known as Product IIA-2, yield 1789.5 grams, pour point minus 33° C., Gibbs test .25% free cardanol, and consisting essentially of reaction product of Formula IIA, with $x$ being 1 and $R_1$ being $CH_3$.

*Example IIA-3*

Employed the same procedure as that set forth in Example IIA-1 except that only 600 grams of vacuum distilled cardanol, 6 grams of 50% aqueous solution of sodium hydroxide and 174 grams of butylene oxide and 9.6 grams of 16% hydrochloric acid were used. The resultant product known as Product IIA-3 was liquid, having pour point minus 33.5° C., with yield of 743 grams and Gibbs test of 6.5% free cardanol, and consisting essentially of reaction product of Formula IIA with $x$ being 1 and $R_1$ being $C_2H_5$.

*Example IIA-4*

300 grams of vacuum distilled cardanol, 4.5 grams 50% sodium hydroxide, 171.5 grams octylene oxide (85%) and 7.2 grams of hydrochloric acid were employed. After the first dehydration of the cardanol and sodium hydroxide mix in the manner of Example IIA-1, the octylene oxide was added while maintaining the temperature of the mass at 350° F. over ten and one half hour period. Then the mass was neutralized with the hydrochloric acid after the temperature was reduced to 90° C., and then subjected to the other subsequent steps of Example IIA-1 whereby were recovered 14.4 grams of octylene oxide in the distillate. The resultant product, known as Product IIA-4 was liquid, yield 433 grams, pour point minus 42° C., Gibbs test 7.8% free cardanol and consisting essentially of a reaction product of Formula IIA, with $x$ being 1 and $R_1$ being $C_6H_{13}$.

*Example IIA-5*

Employ the same procedure as that of Example IIA-1, but use 906 grams of steamed distilled cardanol, produced according to the method set forth in the U.S. patent to M. T. Harvey 2,223,549 of December 3, 1940, 18 grams of 50% sodium hydroxide, 522 grams of propylene oxide and approriate amount of hydrochloric acid. The resultant product, Product IIA-5, had pour point of minus 26° C. and is a reaction product of Formula IIA, with $x$ being 3 and $R_1$ being $CH_3$.

*Example IIA-6*

Employ procedure and components of Example IIA-5 except 1,044 grams of propylene oxide are employed. The resultant reaction product, Product IIA-6 had pour point of minus 32° C., and is reaction product of Formula IIA, with $x$ being 6 and $R_1$ being $CH_3$.

*Example IIB-1*

172 grams of Product IIA-1 and 102 grams of acetic anhydride were charged into a flask equipped with a reflux condenser and then refluxed together for 5 hours at 139° C. At the end of that period any acetic acid which may have been produced and also excess acetic anhydride are stripped off the reaction mass by heating the mass to 125° C. while under 1 millimeter of mercury pressure. The product, Product IIB-1, was a liquid having a hydroxyl value of 0, pour point of minus 31° C. and consisted essentially of a reaction product of Formula IIB, with $R_2$ being $CH_3$ and $x$ being 1 and $R_1$ being H.

*Example IIB-2*

Into a flask equipped with a reflux condenser were charged 186 grams of Product IIA-3 and 102 grams of acetic anhydride. The mixture was refluxed at 130° C. for 4 hours. Then any acetic acid formed and excess acetic anhydride were stripped off in the manner of Example IIB-1. The resulting product, Product IIB-2, was a liquid, yield 207.5 grams, having pour point of minus 40° C. and consisted essentially of a reaction product of Formula IIB, with $R_2$ being $CH_3$, $x$ being 1 and $R_1$ being $C_2H_5$.

*Example IIB-3*

518 grams of Product IIA-1 was placed in a 2 liter, 3 neck reaction flask equipped with Dean-Stark water trap and reflux condenser. Then 195 grams of "Empac 1210" (a mixture of $C_7$ carboxylic acids) and 180 grams of xylene were added to the flask. The mixture was heated to 350° F. in order to distill an azeotrope of water and xylene into a water trap. After 10 hours, 23.5 cc. of water had been collected, indicating substantially complete reaction and the mass was allowed to cool to room temperature. Xylene and traces of unreacted acid were removed under a vacuum of 1 mm. mercury pressure while increasing the pot temperature to 300° F. The resulting product, Product IIB-3, is a liquid having pour point of minus 43° C. and consists essentially of a reaction product of Formula IIB, with $R_2$ being $C_6H_{13}$, $x$ being 1 and $R_1$ being H.

*Example IIB-4*

344 grams of Product IIA-1, 93 grams of crotonic acid, 6 grams of paratoluene sulphonic acid and 500 cc. of xylene were placed in a flask using the same equipment and procedure as Example IIB-3 for 9 hours of azeotropic distillation whereupon 18.3 cc. water were collected in the water trap indicating 98% reaction. The reaction mass was neutralized with 5% sodium bicarbonate solution and water removed by azeotropic distillation, using the water trap. The dehydrated reaction mixture was filtered through a Buchner funnel and replaced in a clean, dry flask. Xylene and traces of crotonic acid were removed under a vacuum of 1-2 mm. of mercury pressure and a pot temperature of 110° C. The product in the flask, Product IIB-4 was a liquid having a pour point minus 31° C. and consisting essentially of reaction product of Formula IIB, with $R_2$ being $C_3H_5$, $x$ being 1 and $R_1$ being H.

Various recipes may be employed in the production of vulcanizates of the present invention; and the particular components as well as the relative proportions thereof employed as vulcanizing material in combination with said elastomers in the production of vulcanizable or heat curable stocks may vary as is well known to those skilled in the art. When desired said stocks may include as components thereof various fillers, accelerators, antioxidants, etc. known to those skilled in the art. According to this invention the ratio by weight of compounds of Formula II to the rubbery materials or elastomers in said vulcanizable or heat curable stocks may vary over wide limits, depending upon the specific character of the stocks and vulcanizates desired. However, in general the ratio by weight of compounds of Formula II to the elastomers or rubbery materials in said stocks is in the range of about 10-100 parts of compounds of Formula II to 100 parts of the elastomers or rubbery materials, and preferably is about 25-60 parts of compounds of Formula II to 100 parts of the elastomers or rubbery materials.

The following examples are given by way of illustration and not by way of limitation to illustrate various specific novel stocks, novel vulcanizates and methods for producing them. The novel vulcanizates of this invention as well as control vulcanizates were prepared under the same conditions and said vulcanizates were subjected to the same tests and the results were recorded and tabulated for comparison. In order that the results be meaningful for comparative purposes, in the testing of any given elastomer or rubbery material the particular additives normally combined therewith as well as the relative proportions thereof are maintained constant and the proportion of compounds of Formula II is also maintained constant so that the relative effects thereon of said compounds of Formula II may be ascertained.

The materials in the stated proportions as set forth in the respective recipes of the following Examples C-1 and 1-10 were blended or mixed together to uniformity on a cool mill and using standard procedure to provide separate stocks which were individually cured for 60 minutes at 287° F. to provide control vulcanizates C-1 and novel vulcanizates V-1 to V-11 which were individually tested and the results recorded, as shown in the table hereinafter set forth.

*Example C-1 (Control)*

Parts by Weight

GRS-1602 (copolymer of butadiene 1,3 and styrene) _____ 150
Philblack "0" (carbon black) _____ 25
Zinc oxide _____ 3
Stearic acid _____ 1
Sulfur _____ 2.2
Santocure (accelerator-N-cyclohexyl-2-benzothiazylsulfonamide) _____ 1.2
Betanox special (antioxdant-ketone-amine condensation product) _____ 1 whereby there is produced vulcanizate C-1.

*Examples 1–10*

Ten recipes the same as that of Example C-1 except that to them there are added 40 parts by weight of said Products IIA-1, IIA-2, IIA-3, IIA-4, IIA-5, IIA-6, IIB-1, IIB-2, IIB-3, IIB-4 respectively to provide ten novel stocks which differ from each other in only the particular Product IIA or IIB employed as a component thereof, and to provide ten different novel vulcanizates V-1, V-2, V-3, V-4, V-5, V-6, V-7, V-8, V-9 and V-10 respectively.

The materials in the stated proportions as set forth in the respective recipes of the following Examples C-2 and 11 were blended or mixed together to uniformity on a cool mill and using standard procedure to provide separate stocks which were individually cured for 60 minutes at 287° F. to provide control vulcanizate C-2 and novel vulcanizate V-11, which were individually tested and the results recorded, as shown in the table hereinafter set forth.

*Example C-2 (Control)*

Parts by weight

Hycar 1001 (copolymer of butadiene 1,3 and acrylonitrile) _____ 100
Gastex SRF (carbon black) _____ 75
Zinc oxide _____ 5
Sulfur _____ 1.5
Altax (accelerator-benzothiazyl disulfide) _____ 1.5
Stearic acid _____ 0.5
Betanox special _____ 1 to provide vulcanizate C-2

*Example 11*

Same recipe as that of Example C-2 except that there is added thereto 40 parts by weight of said Product IIA-1 whereby there is produced novel vulcanizate, V-11.

The materials in the stated proportions as set forth in the respective recipes of the following Examples C-3 and 12 were blended or mixed together to uniformity on a cool mill and using standard procedure to provide separate stocks which were individually cured for 60 minutes at 287° F. to provide control vulcanizates C-3 and novel vulcanizate V-12, which were individually tested and the results recorded in the table hereinafter set forth.

*Example C-3 (Control)*

Parts by weight

Neoprene W (polymer of chloroprene) _____ 100
Gastex SRF _____ 75
Zinc oxide _____ 5
Magnesia _____ 2
Stearic acid _____ 0.5
NA-22 (accelerator-2-mercapto imidazoline) _____ 0.5
Betanox special _____ 1

Whereby there is provided vulcanizate C-3.

*Example 12*

Same recipe as that of Example C-3 except that there is added thereto 40 parts by weight of said Product IIA-1 whereby there is produced novel vulcanizate, V-12.

|  | V-1 | V-2 | V-3 | V-4 | V-5 | V-6 | V-7 | V-8 | V-9 | V-10 | C-1 | V-11 | C-2 | V-12 | C-3 |
|---|---|---|---|---|---|---|---|---|---|---|---|---|---|---|---|
| Original properties: | | | | | | | | | | | | | | | |
| Tensile, p.s.i. | 2,730 | 2,460 | 2,440 | 2,250 | 2,350 | 1,740 | 1,810 | 1,540 | 2,650 | 1,850 | 3,260 | 2,120 | 3,100 | 2,620 | 3,260 |
| Elongation, percent | 520 | 690 | 610 | 690 | 370 | 310 | 500 | 480 | 465 | 270 | 320 | 600 | 320 | 340 | 180 |
| Hardness | 52 | 50 | 50 | 50 | 56 | 56 | 46 | 46 | 50 | 53 | 66 | 40 | 75 | 42 | 79 |
| 300% modulus, p.s.i. | 1,470 | 910 | 1,050 | 920 | 1,860 | -------- | 880 | 850 | 1,670 | -------- | -------- | 880 | 3,050 | 2,330 | -------- |
| Percent set | 18 | 18 | 18 | 25 | 9 | 6 | 6 | 9 | 9 | 1 | 0 | 12 | 9.4 | 6.2 | 0 |
| Bashore resilience, percent | 36 | 36 | 35 | 36 | -------- | -------- | 39 | 38 | 39 | 38 | 44 | 22 | 7 | 39 | 33 |
| After aging 48 hrs. at 212° F.: | | | | | | | | | | | | | After aging 70 hrs. at 250° F. | | |
| Tensile, p.s.i. | 2,520 | 1,580 | 1,660 | 1,920 | 2,400 | 2,460 | 1,870 | 1,470 | 2,260 | 1,770 | 2,570 | 2,820 | 3,050 | 2,110 | 3,090 |
| Elongation, percent | 380 | 320 | 330 | 400 | 330 | 320 | 380 | 320 | 315 | 175 | 190 | 420 | 160 | 390 | 150 |
| Hardness | 59 | 60 | 60 | 60 | 61 | 59 | 55 | 55 | 60 | 65 | 71 | 56 | 83 | 50 | 84 |
| 300% modulus, p.s.i. | 2,050 | -------- | 1,500 | 1,400 | 2,130 | 2,310 | 1,450 | 1,450 | 2,190 | -------- | -------- | 2,110 | -------- | 1,910 | -------- |
| Percent set | 12 | 6 | 6 | 9 | 6 | 6 | 6 | 3 | 2 | 0 | 0 | 3.1 | 0 | 6.2 | 0 |
| Percent weight loss 4 hrs. at 300° F. | 3.3 | 2.5 | 1.5 | 1.6 | 4.4 | 2.6 | 1.8 | 2.0 | 1.6 | 1.4 | 1.5 | 4.5 | 0.9 | 3.2 | 0.33 |
| Moony viscosity 4 M L at 212° F. | 38 | 36 | 37 | 36 | 42 | 38 | 36 | 36 | 33 | 38 | -------- | 29 | 200+ | 72 | 200+ |
| Gehman flexibility, ° F.: | | | | | | | | | | | | | | | |
| $T_2$ | −24 | −10 | −22 | −27 | −15 | −26 | −22 | 10 | −20 | −24 | −11 | 25 | 28 | −20 | 0 |
| $T_5$ | −40 | −45 | −52 | −46 | −44 | −46 | −49 | −44 | −54 | −51 | −36 | 5 | 14 | −33 | −26 |
| $T_{10}$ | −47 | −50 | −60 | −51 | −53 | −53 | −58 | −47 | −63 | −57 | −42 | 1 | 10 | −36 | −31 |
| $T_{100}$ | −58 | −53 | −67 | −56 | −71 | −72 | −71 | −69 | −72 | −74 | −49 | −22 | 3 | −42 | −38 |
| Scott brittle pt., ° F. | −58 to −67 | −54 to −58 | −72 to −80 | −60 to −64 | −60 to −67 | −67 to −72 | −81 to −85 | −76 to −80 | −71 to −76 | −67 to −74 | -------- | −13 to −20 | −10 to −18 | −46 to −49 | −42 to −44 |

All of the stocks produced by following the procedure and employing the components of the foregoing examples are vulcanizable or heat curable stocks and each of them includes one of said vulcanizable elastomers and material capable of vulcanizing said elastomer. It is to be understood that other specific vulcanizable copolymers of butadiene 1,3 and styrene, other vulcanizable copolymers of butadiene 1,3 and acrylonitrile and other vulcanizable homopolymers of chloroprene, well known to those skilled in the art, may be substituted for said GRS–1602, Hycar 1001 and Neoprene W respectively and other specific vulcanizing materials therefor, also well known to those skilled in the art, may be substituted for those employed in the foregoing examples. Likewise, the accelerator, filler, etc. as well as the relative proportion of components may be varied depending upon the character of vulcanizable stock desired.

Since certain changes in carrying out the above process and certain modifications in the compositions embodying the invention may be made without departing from its scope, it is intended that all matter contained in the above description shall be interpreted as illustrative and not in a limiting sense. It is also to be understood that other materials may be added to our novel compositions of matter herein claimed without departing from the spirit of the invention. Particularly, it is to be understood that in said claims, ingredients or components recited in the singular are intended to include compatible mixtures of said ingredients wherever the sense permits.

I claim:

1. A composition of matter comprising (1) a normally solid elastomer selected from the group consisting of copolymers of butadiene 1,3 and styrene, copolymers of butadiene 1,3 and acrylonitrile and homopolymers of chloroprene intimately combined with (2) a material for plasticizing said (1) and being of the following formula:

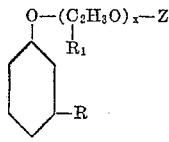

in which R is a straight chain unsaturated hydrocarbon radical of 15 carbon atoms, with said unsaturation due solely to ethylenic linkage therein; $R_1$ is selected from the group consisting of hydrogen and alkyl radicals of 1–9 carbon atoms; Z is selected from the group consisting of hydrogen and $OCR_2$, with $R_2$ selected from the group consisting of alkyl radicals of 1–10 carbon atoms and alkenyl radicals of 2–10 carbon atoms; and $x$ is 1–8.

2. A stock comprising (1) a vulcanizable elastomer selected from the group consisting of normally solid copolymers of butadiene 1,3 and styrene, normally solid copolymers of butadiene 1,3 and acrylonitrile and normally solid polymers of chloroprene intimately combined with (2) vulcanizing material for said (1) and (3) a material for plasticizing said (1) and being of the following formula:

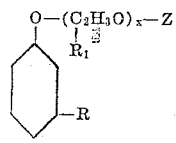

in which R is a straight chain unsaturated hydrocarbon radical of 15 carbon atoms, with said unsaturation due solely to ethylenic linkage therein; $R_1$ is selected from the group consisting of hydrogen and alkyl radicals of 1–9 carbon atoms; Z is selected from the group consisting of hydrogen and $OCR_2$, with $R_2$ selected from the group consisting of alkyl radicals of 1–10 carbon atoms and alkenyl radicals of 2–10 carbon atoms; and $x$ is 1–8.

3. A stock as defined in claim 2, with said (1) being normally solid copolymer of butadiene 1,3 and styrene.

4. A stock as defined in claim 2, with said Z being hydrogen.

5. A stock as defined in claim 2, with said Z being said $OCR_2$.

6. A stock as defined in claim 2, with said (1) being normally solid copolymer of butadiene 1,3 and styrene and said Z being hydrogen.

7. A stock as defined in claim 2, with said (1) being normally solid copolymer of butadiene 1,3 and styrene and said Z being said $OCR_2$.

8. A stock as defined in claim 2, with the ratio by weight of said (3) to said elastomer being about 10–100 parts by weight of the former to 100 parts by weight of the latter.

9. A vulcanizate produced by heat curing a stock as defined in claim 2.

References Cited in the file of this patent

UNITED STATES PATENTS

| | | |
|---|---|---|
| 2,384,323 | McCleary | Sept. 4, 1945 |
| 2,401,095 | Novotny et al. | May 28, 1946 |
| 2,434,797 | Harvey | Jan. 20, 1948 |
| 2,519,013 | Banigan | May 15, 1950 |

FOREIGN PATENTS

| | | |
|---|---|---|
| 628,358 | Great Britain | Aug. 26, 1949 |